(12) United States Patent
Schwager et al.

(10) Patent No.: US 11,243,580 B1
(45) Date of Patent: Feb. 8, 2022

(54) CAMERA INTEGRATION IN A PORTABLE INFORMATION HANDLING SYSTEM

(71) Applicant: Dell Products L.P., Round Rock, TX (US)

(72) Inventors: Mark Andrew Schwager, Cedar Park, TX (US); Yu-Feng Huang, Hsin-Chu (TW); Kai-Yuan Cheng, Taipei (TW); Yao Hsien Huang, New Taipei (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/084,348

(22) Filed: Oct. 29, 2020

(51) Int. Cl.
*G06F 1/16* (2006.01)

(52) U.S. Cl.
CPC .......... *G06F 1/1686* (2013.01); *G06F 1/1616* (2013.01)

(58) Field of Classification Search
CPC .............................. G06F 1/1616; G06F 1/1686
See application file for complete search history.

(56) References Cited

U.S. PATENT DOCUMENTS

| | | | | |
|---|---|---|---|---|
| 10,904,412 | B2 * | 1/2021 | Jarvis | H04N 5/2257 |
| 2012/0105400 | A1 * | 5/2012 | Mathew | G06F 1/1686 |
| | | | | 345/207 |
| 2018/0026152 | A1 * | 1/2018 | Benson | G06F 3/041 |
| | | | | 257/82 |
| 2020/0241595 | A1 * | 7/2020 | Kuna | H04R 1/403 |
| 2021/0112184 | A1 * | 4/2021 | Jarvis | H04N 5/2256 |
| 2021/0168225 | A1 * | 6/2021 | Bates | H04M 1/0206 |
| 2021/0168229 | A1 * | 6/2021 | Kallman | G06F 1/1684 |

* cited by examiner

*Primary Examiner* — Adrian S Wilson
(74) *Attorney, Agent, or Firm* — Terrile, Cannatti & Chambers; Stephen A. Terrile (57) ABSTRACT

A portable information handing system. The portable information handling system includes a base chassis, the base chassis comprising a motherboard, the motherboard comprising a processor and a bus coupled to the processor, and a display chassis, the display chassis comprising a rear display cover, the rear display cover comprising a rear display cover portion, a camera component and a bezel, the rear display cover portion comprising a camera component attachment portion, the camera component attachment portion comprising a first ledge and a second ledge, the camera component being positioned between the first ledge and the second ledge, the bezel being attached to the rear display cover portion via the first ledge and the second ledge, the first ledge and the second ledge providing structural support for the bezel.

18 Claims, 5 Drawing Sheets

CAMERA INTEGRATION IN A PORTABLE INFORMATION HANDLING SYSTEM

BACKGROUND OF THE INVENTION

Field of the Invention

The present invention relates to information handling systems. More specifically, embodiments of the invention relate to camera integration in a portable information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment the invention relates to a portable information handing system, comprising: a base chassis portion, the base chassis portion comprising a motherboard; and, a display chassis portion, the display chassis portion comprising a rear display cover portion, a camera component and a bezel, the rear display cover portion comprising a camera component attachment portion, the camera component attachment portion comprising a first ledge and a second ledge, the camera component being positioned between the first ledge and the second ledge, the bezel being attached to the rear display cover portion via the first ledge and the second ledge, the first ledge and the second ledge providing structural support for the bezel.

In another embodiment the invention relates to an information handling system comprising: a base chassis, the base chassis comprising a motherboard, the motherboard comprising a processor and a bus coupled to the processor; and, a display chassis, the display chassis comprising a rear display cover, the rear display cover comprising a rear display cover portion, a camera component and a bezel, the rear display cover portion comprising a camera component attachment portion, the camera component attachment portion comprising a first ledge and a second ledge, the camera component being positioned between the first ledge and the second ledge, the bezel being attached to the rear display cover portion via the first ledge and the second ledge, the first ledge and the second ledge providing structural support for the bezel.

In another embodiment the invention relates to a display chassis, comprising: a rear display cover, a camera component and a bezel, the rear display cover, the rear display cover comprising a camera component attachment portion, the camera component attachment portion comprising a first ledge and a second ledge, the camera component being positioned between the first ledge and the second ledge, the bezel being attached to the rear display cover portion via the first ledge and the second ledge, the first ledge and the second ledge providing structural support for the bezel.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
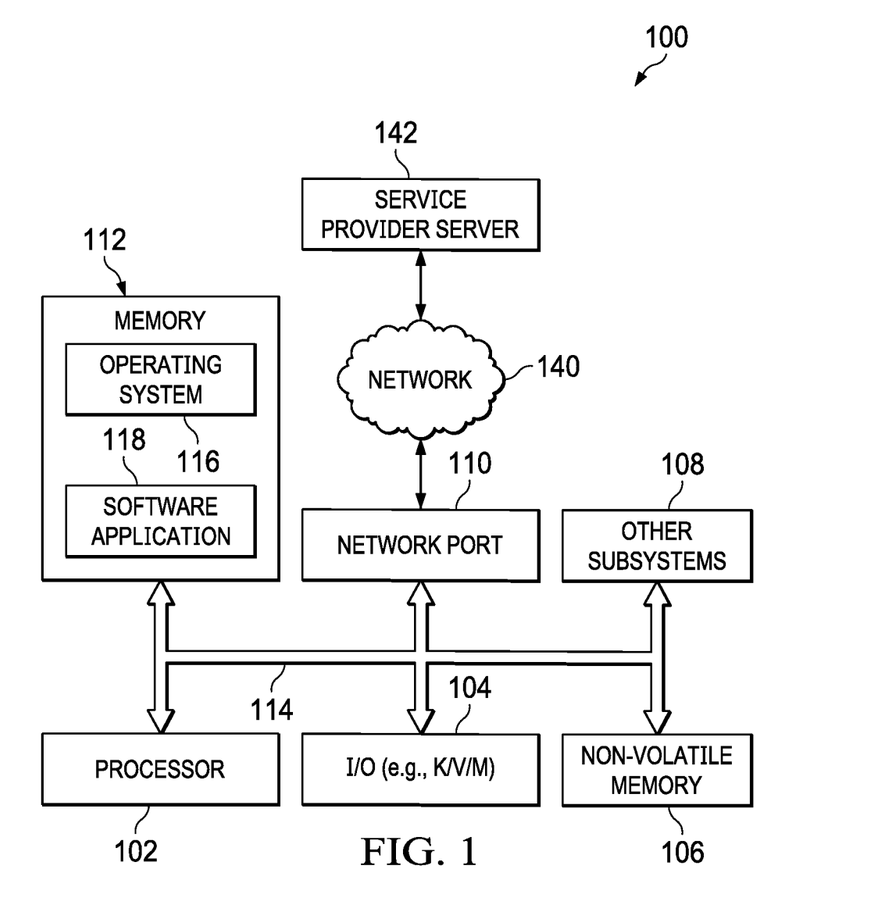
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise at least one software application 118. In one embodiment, the information handling system 100 is able to download the software application from the service provider server 142. In another embodiment, the software application 118 is provided as a service from the service provider server 142.

Figure 2:
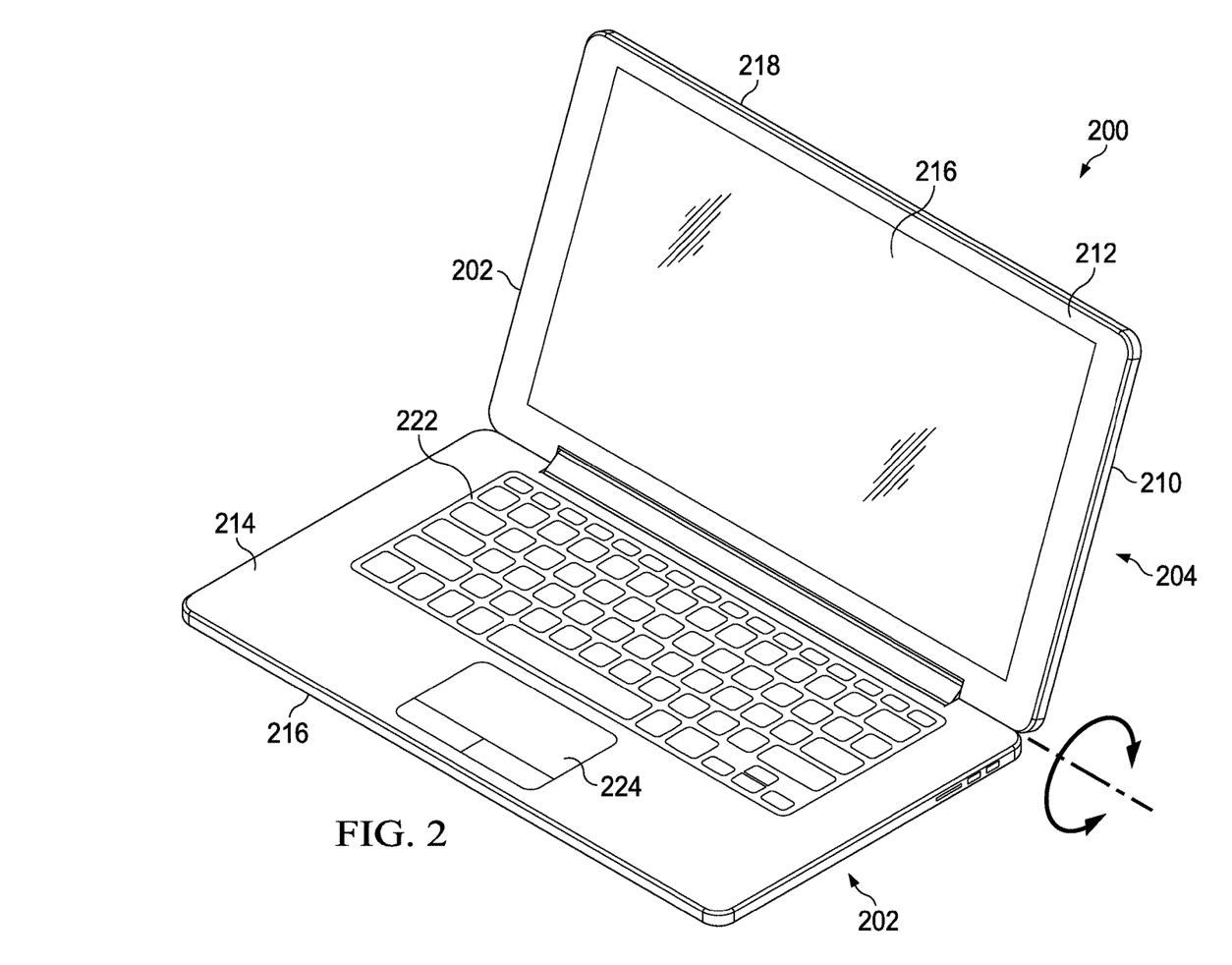
FIG. 2 shows a perspective view of an example portable information handling system.

FIG. 2 shows a perspective view of an example portable information handling system chassis 200 such as a tablet type portable information handling system, a laptop type portable information handling system, or any other mobile information handling system. It will be appreciated that some or all of the components of the information handling system 100 may be included within information handling system chassis 200. The portable information handling system 200 chassis includes a base chassis 202 and a display chassis 204 shown in an open configuration. It will be appreciated that a closed configuration would have the display chassis 204 fully closed onto the base chassis 202.

The base chassis 202 or the display chassis 204 of the information handling system 200 may comprise an outer metal case or shell. The information handling system 200 may include a plurality of chassis portions. In various embodiments, the information handling system 200 may include some or all of an A-Cover 210, a B-Cover 212, a C-cover 214 and a D-Cover 216. In various embodiments, the A-Cover 210 and the B-Cover 212 provide the display chassis 204. In various embodiments, the C-Cover 214 and the D-Cover 216 provide the base chassis 202.

In various embodiments, the A-cover 210 encloses a portion of the display chassis 204 of the information handling system 200. In various embodiments, the B-cover 212 encloses another portion of the display chassis 204 of the information handling system 200. In various embodiments, the B-Cover may include a display screen 216 and a bezel 218 around the display screen.

In various embodiments, the C-cover 214 encloses a portion of the base chassis 202 of the information handling system 200. In various embodiments, the C-cover 214 may include, for example, a keyboard 222, a trackpad 224, or other input/output (I/O) device. In various embodiments, certain components of the information handling system such as a mother board are mounted within the C-Cover 214. In various embodiments, the D-cover 216 encloses another portion of the base chassis 202 of the information handling system 200.

When placed in the closed configuration, the A-cover 202 forms a top outer protective shell, or a portion of a lid, for the information handling system 200, while the D-cover 204 forms a bottom outer protective shell, or a portion of a base, for the information handling system. When in the fully closed configuration, the A-cover 202 and the D-cover 204 would be substantially parallel to one another.

In some embodiments, both the A-cover 202 and the D-cover 204 may be comprised entirely of metal. In some embodiments, the A-cover 202 and D-cover 204 may include both metallic and plastic components. For example, plastic components that are radio-frequency (RF) transparent may be used to form a portion of the C-cover 208.

In various embodiments, the A-cover 202 may be movably connected to a back edge of the C-cover 204 via one or more hinges. In this configuration, the hinges allow the A-cover 202 to rotate from and to the C-cover 204 allowing for multiple orientations of the information handling system 200. In various embodiments, the information handling system may include a sensor to detect the orientation of the information handling system and activate or deactivate any number of antenna systems based on the occurrence of any specific orientation. In some embodiments, the information handling system may be a laptop with limited rotation of the A-cover 204 with regard to the C-cover 204, for example up to 180° rotation arc. In other embodiments the information handling system 200 may be a convertible information handling system with full rotation to a tablet configuration. It will be appreciated that in other embodiments, the A-Cover could attach to the B-Cover of the D-Cover.

Figure 3:
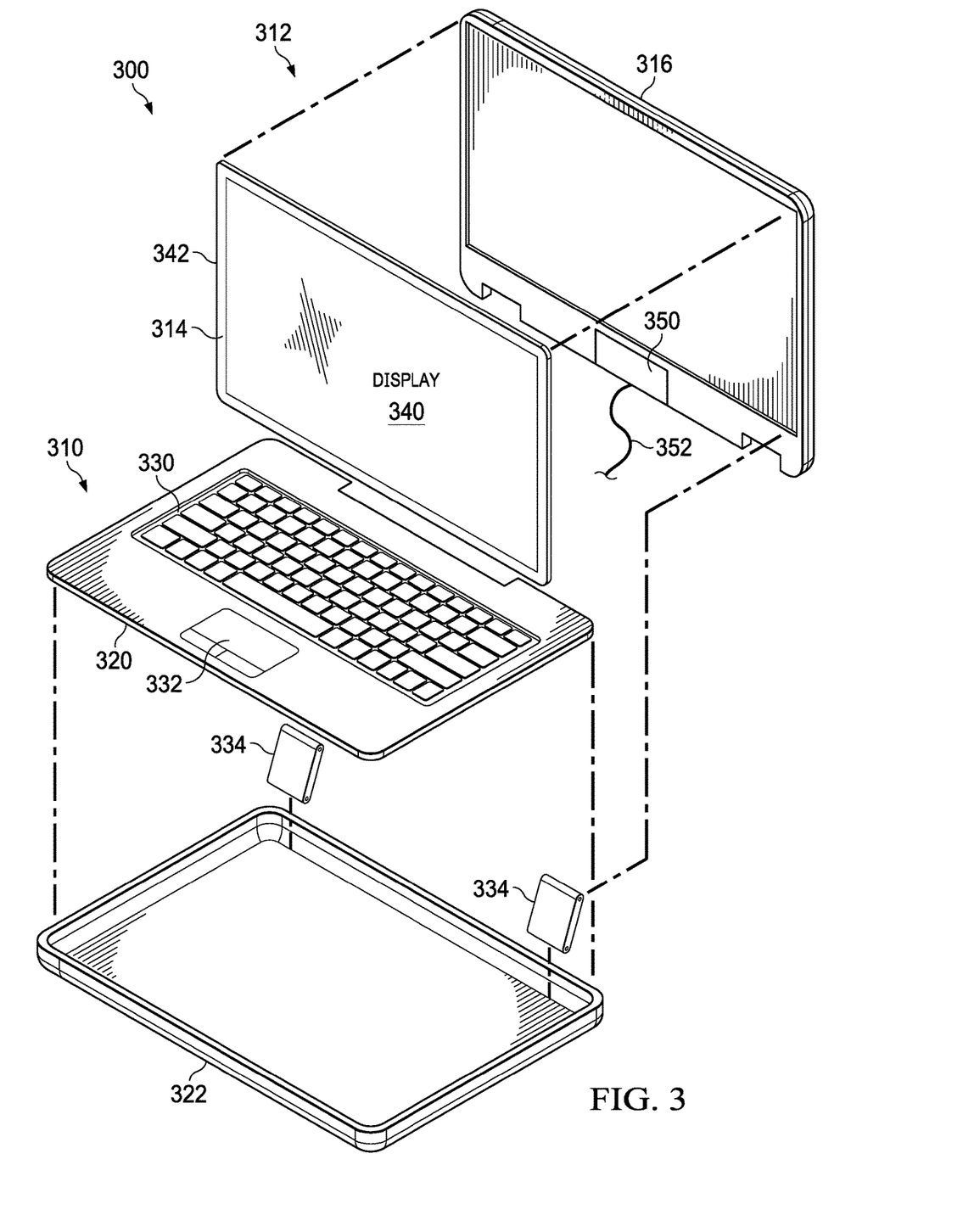
FIG. 3 shows a blown-up view of a portable information handling system.

FIG. 3 shows a blown-up view of a portable information handling system 300 having rotationally-coupled housing portions. In the example embodiment, a main housing portion 310 (which corresponds to a base chassis 202) rotationally couples to a lid housing portion 312 (which corresponds to a display chassis 204) to support various configurations to interact with an end user. Main housing portion 310 may hold one or more components of the portable information handling system, including but not limited to processor 102, system bus 114, memory subsystem 112, I/O subsystem 104 and network interface 110 discussed with respect to FIG. 1. Main housing portion 310 includes a top cover portion 320 (which includes the C-Cover 214) and a bottom cover portion 322 (which includes the D-Cover 216). Lid housing portion 312 includes a display cover portion 314 (which includes the B-Cover 210) and a rear display cover portion 316 (which includes the A-Cover 212). The top cover portion 320 may include an integrated keyboard 330 or other I/O devices, such as a trackpad 332 or microphone (not shown).

Lid housing portion 312 is rotationally coupled to main housing portion 310 via at least one hinge assembly 334. Lid housing portion 212 includes display 340 that visually presents information to the user as well as a bezel 342. Display 340 may be a touch panel with circuitry enabling touch functionality in conjunction with a display. In some embodiments, display 340 may be an "infinity edge" or "narrow bezel" display that approaches one or more the edges of lid housing portion 212 such that bezel may be narrow in size (e. g., less than 10 millimeters) on the edges. For example, display 340 is an infinity display with narrow bezels on the top and sides of lid housing portion 212 in the embodiment shown in FIG. 3. In certain embodiments, the side bezel is less than 4 mm (+/−10%) and the top bezel is less than 6 mm (+/−10%).

Lid housing portion 212 may also include timing controller (TCON) 350. Hinge assembly 330 may include cable 352 for communicably coupling one or more components within main housing portion 310 to one or more components within lid housing portion 312. For example, cable 352 may provide communication of graphics information from an I/O subsystem to TCON 350 for generation of visual images for display on display 340. Although a single cable 352 is shown, portable information handling system 300 may include one or more additional cables 352 for communicating components disposed in main housing portion 310 and lid housing portion 312. Placement of cable 352 may be selected based on design considerations, materials or manufacturing cost, material reliability, antenna placement, as well as any other considerations.

Hinge assembly 334 allows main housing portion 310 and lid housing portion 312 to rotate between a plurality of positions. For example, when portable information handling system 300 is not in use, lid housing portion 312 may be closed over the top of main portion 310 such that display 340 and keyboard 330 are protected from unintended use or damage. Rotation of lid housing portion 312 by approximately 90 degrees from main housing portion 310 brings display 340 in a raised "clamshell" position relative to keyboard 330 so that an end user can make inputs to keyboard 330 or touch panel portion of display 340 while viewing display 340. In some embodiments, clamshell position may represent lid housing portion 212 open between approximately 1 and 180 degrees from main housing portion 310. Rotation of lid housing portion 312 between approximately 180 and 359 degrees from main housing portion 310 may place portable information handling system 300 in "tablet stand" and/or "tent" positions. In tablet stand and tent positions, the user may make inputs via touch panel portion of display 340 while viewing display 340. A full 360 degree rotation of main housing portion 310 relative to lid housing portion 312 provides a tablet configuration having display 340 exposed to accept touch inputs. In any position, user inputs may be communicated to an I/O subsystem or a processor of the portable information handling system 300 for processing, and then updated information may be communicated back via cable 352 to display 340 for displaying to the user. Hinge assembly 334 may be comprised of one or more discrete hinges or a unified assembly of hinges.

Figure 4:
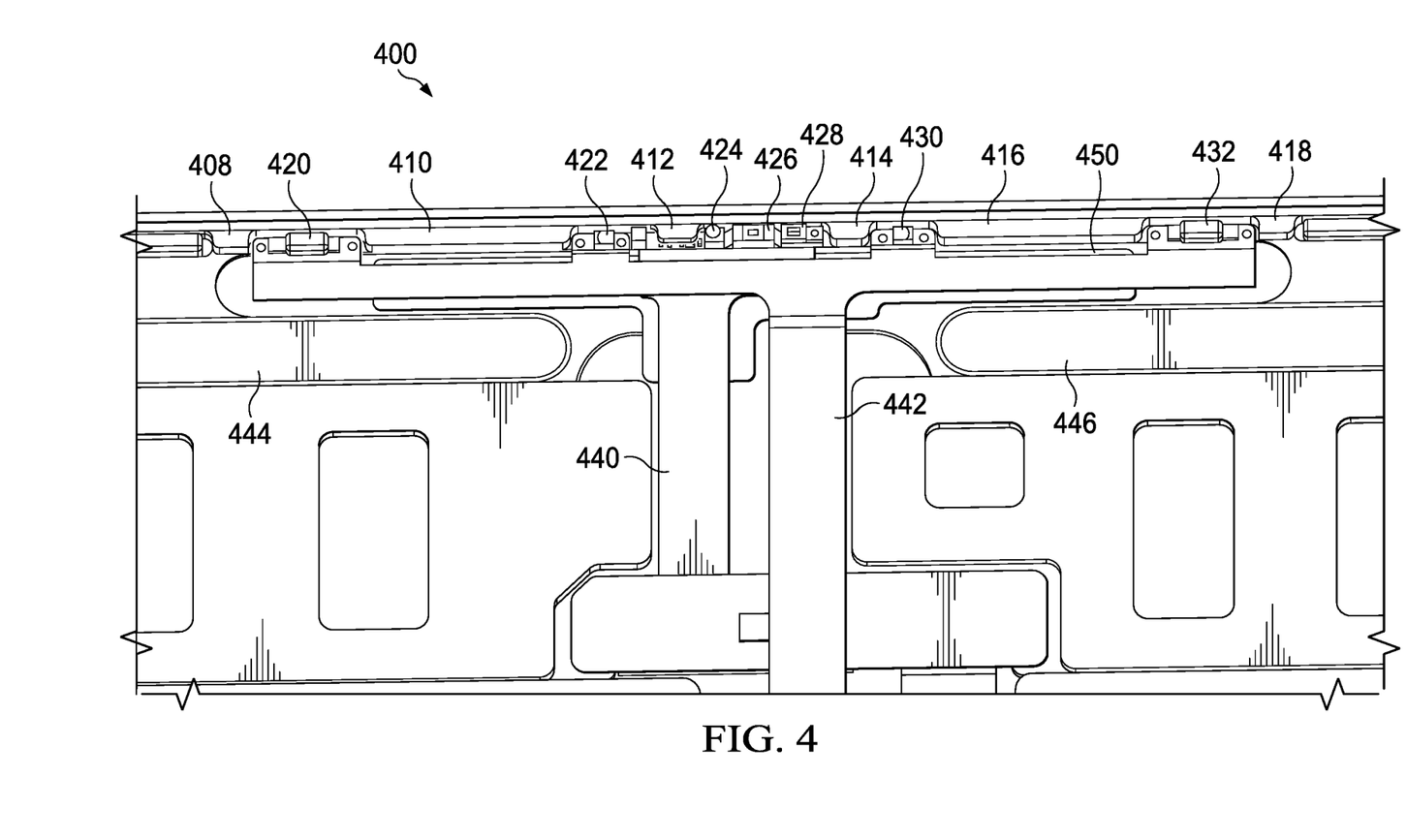
FIG. 4 shows a cut away view of a portion of a display chassis of a portable information handling system.

FIG. 4 shows a cut away view of a portion of a display chassis 400 of a portable information handling system. In various embodiments, the display chassis 400 includes one or more of ledge 408, ledge 410, ledge 412, ledge 414, ledge 416 and ledge 418. In various embodiments, ledge 408, ledge 410, ledge 412, ledge 414, ledge 416 and ledge 418 are used to attach a bezel to the display chassis 400. In various embodiments, ledge 408, ledge 410, ledge 412, ledge 414, ledge 416 and ledge 418 provide shelves on which the bezel rests.

In various embodiments, adhesive is applied to each ledge to adhere the bezel to the display chassis 400. In various embodiments each ledge includes a corresponding ledge area defined by the width and length of the respective ledge. In certain embodiments, each ledge has a length of 2.64 mm (+/−10%). Each ledge area provides a corresponding adhesive area. In certain embodiments, there is an offset from an edge of the display cover to where the adhesive begins, causing the adhesive area to be a bit smaller than the corresponding ledge area. In certain embodiments, the offset is 0.4 mm (+/−10%) so the adhesive area of a ledge is 2.35 mm by the width of the respective ledge. In various embodiments, the ledge area of the ledges is maximized to provide a connection between the display chassis 400 and the bezel. In certain embodiments, the minimum adhesive area is 2.35 mm (+/−10%) by 5.5 mm (+/−10%). In certain embodiments, the display chassis 400 is used in a non-touch portable information handling system.

In various embodiments, the spacing of the ledges is designed to provide an interlacing structure between a cover of the display chassis and components mounted within the display chassis. In various embodiments, the components of the display chassis 400 include one or more of a microphone 420, an infrared light emitting diode (IR LED) 422, an ambient light sensor (ALS) 424, a light sensor 426, a status LED 428, an IR LED 430 and a microphone 432. In various embodiments, the IR LED 422 and the IR LED 430 are used with a biometrics security system such as the Windows Hello system available from Microsoft.

In various embodiments, the display chassis 400 includes a cable 440 and a cable 442. In various embodiments, the cable 440 includes a camera control cable. In various embodiments, the cable 442 includes at least one of a microphone control cable and an IR control cable. In certain embodiments, the display chassis 400 includes one or both of adhesive portion 444 and adhesive portion 446. In certain embodiments, adhesive portion 444 and adhesive portion 446 are used to adhere a display component to the display chassis 400. In various embodiments, the cable 440 includes a rigid flex portion 448 which is bonded to the camera component via an adhesive conductive film (ACF). In certain embodiments, the cable may be bonded directly to the camera component via an ACF bond.

In certain embodiments, one or both of cable 440 and cable 442 are positioned in the center of the display chassis 400. In certain embodiments, positioning the cables in the center of the display chassis 400 allows adhesive portion 444 and adhesive portion 446 to be maximized across the width of the display chassis 400.

In certain embodiments, the display chassis 400 includes a heat dissipation component 450. In various embodiments, the heat dissipation component 450 includes a metal sheet (e.g., a copper sheet). In various embodiments, the heat dissipation component 450 is positioned contiguous with some or all of the components of the display chassis to dissipate heat generated by the components. In certain embodiments, the heat dissipation component 450 is positioned contiguous with the LED components of the display chassis.

Figure 5:
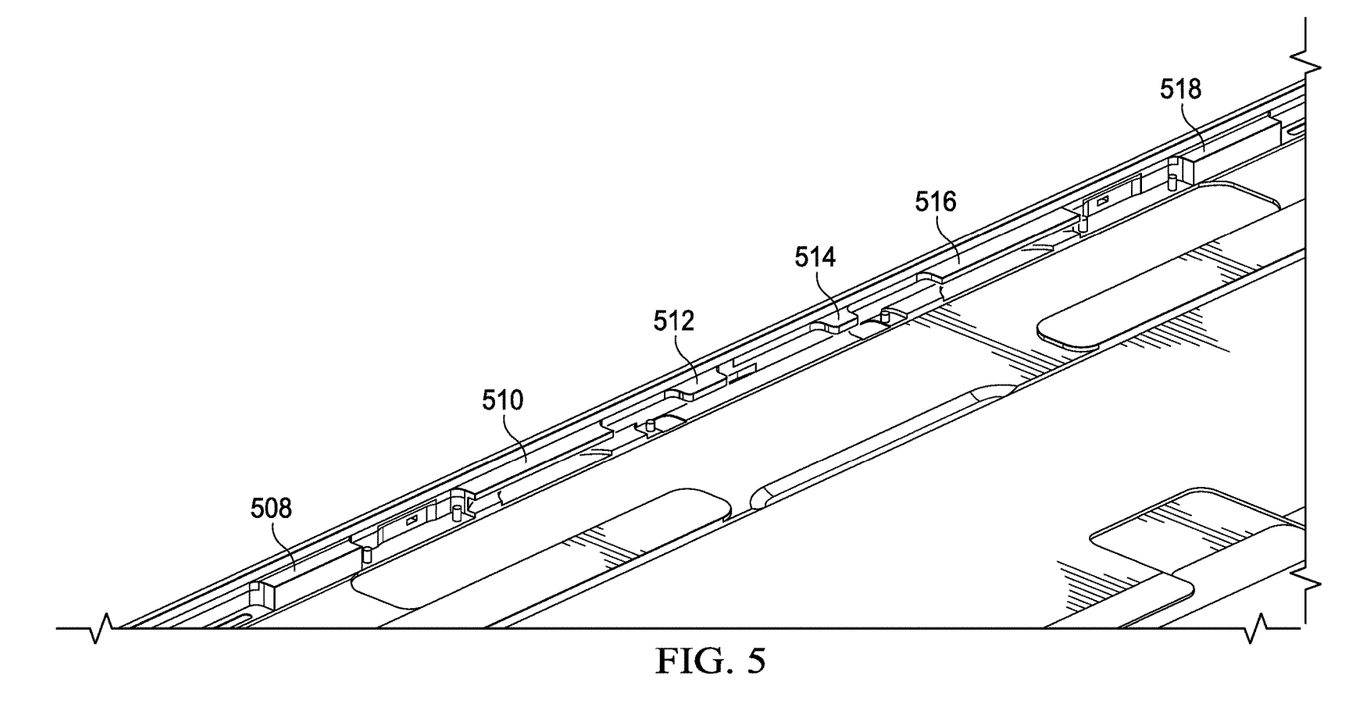
FIG. 5 shows a perspective view of a portion of a rear display cover of a display chassis of a portable information handling system.

FIG. 5 shows a perspective view of a portion of a rear display cover 500 of a display chassis of a portable information handling system. In various embodiments, the display chassis 500 includes one or more of ledge 508, ledge 510, ledge 512, ledge 514, ledge 516 and ledge 518. In various embodiments, ledge 508, ledge 510, ledge 512, ledge 514, ledge 516 and ledge 518 are used to attach a bezel to the display chassis 500. In various embodiments, ledge 508, ledge 510, ledge 512, ledge 514, ledge 516 and ledge 518 provide shelves on which the bezel rests. In various embodiments, ledge 508, ledge 510, ledge 512, ledge 514, ledge 516 and ledge 518 correspond to ledge 408, ledge 410, ledge 412, ledge 414, ledge 416 and ledge 418, respectively.

In various embodiments, one or more of ledge 510, ledge 512, ledge 514, and ledge 516 extend from an inside wall of the rear display cover 500 and include an open portion below the extended ledge to allow components to be interlaced underneath the respective ledge. In various embodiments, one or more of ledge 508 and ledge 518 extend down to the plane of the A-Cover to provide additional structural integrity to the rear display cover 500 as well as to the bezel coupled to the display cover 500.

Figure 6:
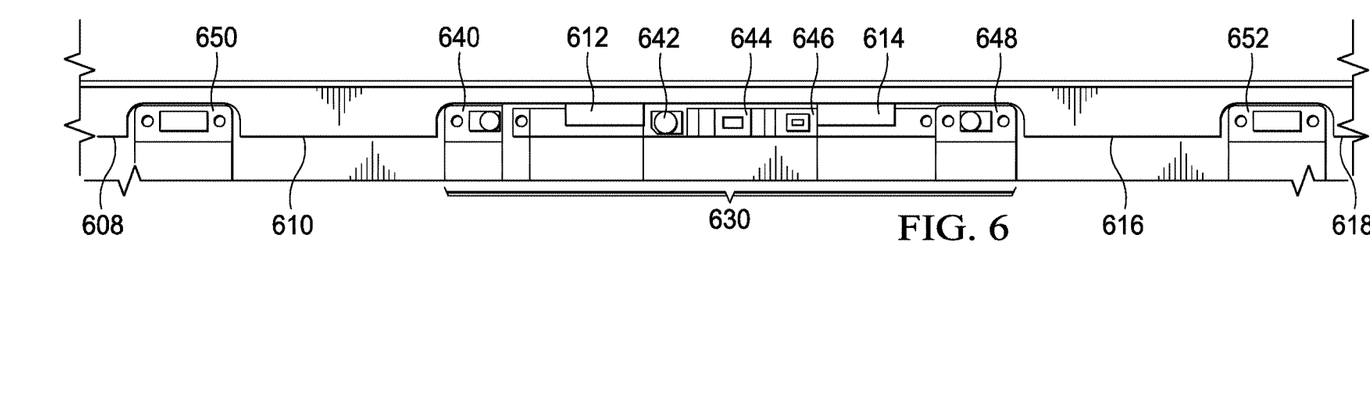
FIG. 6 shows a detail view of a portion of a rear display cover of a display chassis of a portable information handling system.

FIG. 6 shows a detail view of a portion of a rear display cover 600 of a display chassis of a portable information handling system. Each ledge (also referred to as a roof) includes a corresponding width across a top edge of the rear display cover 600. In certain embodiments, pairs of ledges define an open space across a top edge of the rear display cover 600. For the purposes of this disclosure the top edge is the edge along which at least one of a camera mechanism and one or more speakers are positioned. In various embodiments, ledge 608, ledge 610, ledge 612, ledge 614, ledge 616 and ledge 618 provide shelves on which the bezel rests. In various embodiments, ledge 608, ledge 610, ledge 612, ledge 614, ledge 616 and ledge 618 correspond to ledge 408, ledge 410, ledge 412, ledge 414, ledge 416 and ledge 418, respectively.

In various embodiments, the corresponding width of ledge 608 is 4.82 mm (+/−10%). In various embodiments, the corresponding width of ledge 610 is 15.75 mm (+/−10%). In various embodiments, the corresponding width of ledge 612 is 6.45 mm (+/−10%). In various embodiments, the corresponding width of ledge 614 is 6.45 mm (+/−10%). In various embodiments, the corresponding width of ledge 616 is 15.75 mm (+/−10%). In various embodiments, the corresponding width of ledge 618 is 4.82 mm (+/−10%). In certain embodiments, ledge 608 is combined with additional elements to provide an adhesion surface which is 70.04 mm (+/−10%) wide. In various embodiments, ledge 618 is combined with additional elements to provide an adhesion surface which is 74.53 mm (+/−10%) wide.

In various embodiments, ledge 608 and ledge 610 define an open space of 10.60 mm (+/−10%). In various embodiments, ledge 610 and ledge 612 define an open space of 10.78 mm (+/−10%). In various embodiments, ledge 612 and ledge 614 define an open space of 14.43 mm (+/−10%). In various embodiments, ledge 610 and ledge 612 define an open space of 6.45 mm (+/−10%). In various embodiments, ledge 614 and ledge 616 define an open space of 10.78 mm (+/−10%). In various embodiments, ledge 616 and ledge 618 define an open space of 10.60 mm (+/−10%).

Various aspects of the present disclosure include an appreciation that no open space across the top edge of the rear display cover should be greater than a predetermined width, the predetermined width being sufficient to provide structural stability to the display cover. Various aspects of the present disclosure include an appreciation that no open space across the top edge of the rear display cover should be greater than substantially 15.00 mm (i.e., 15 mm+/−10%). Various aspects of the present disclosure include an appreciation that no width of a ledge should be less than a predetermined width, the predetermined width being sufficient to provide structural stability to the display cover. Various aspects of the present disclosure include an appreciation that no width of a ledge should be less than substantially 6.25 mm (i.e., 6.25 mm+/−10%). Various aspects of the present disclosure include an appreciation that providing a rear display cover with at least one of no open space greater than 15 mm (+/−10%) and a width of a ledge no less than 6.25 (+/−10%) provides a bezel connection which can withstand harsh operating conditions such as high temperature conditions, cold temperature conditions and humid conditions. Various aspects of the disclosure include an appreciation that the structural stability prevents bonding degradation due to adverse or harsh conditions. Various aspects of the disclosure include an appreciation that the structural stability provides a minimum retentions strength to prevent delamination if something slides underneath the bezel (e.g., a stack of papers wedged in between the display and the base).

In various embodiments, a camera component 630 is attached along the top edge of the rear display cover 600. In various embodiments, the camera component 630 includes one or more of an IR LED 640, an ALS 642, a light sensor 644, a status LED 646 and an IR LED 648. In various embodiments, a speaker 650 is attached along the top edge of the rear display cover 600. In various embodiments, another speaker 652 is attached along the top edge of the rear display cover 600. In various embodiments, the camera component 630 is positioned between ledge 610 and ledge 616. In various embodiments, the IR LED 640 is positioned between ledge 610 and ledge 612. In various embodiments, the ALS 642, light sensor 644 and status LED 446 are positioned between ledge 612 and ledge 614. In various embodiments, the IR LED 640 is positioned between ledge 610 and ledge 612. In various embodiments, the IR LED 648 is positioned between ledge 614 and ledge 616. In various embodiments, the speaker 650 is positioned between ledge 608 and ledge 610. In various embodiments, the speaker 652 is positioned between ledge 616 and ledge 618.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A portable information handing system, comprising:
   a base chassis portion, the base chassis portion comprising a motherboard; and,
   a display chassis portion, the display chassis portion comprising a rear display cover portion, a camera component and a bezel, the rear display cover portion comprising a camera component attachment portion, the camera component attachment portion comprising a first ledge and a second ledge, the camera component being positioned between the first ledge and the second ledge, the bezel being attached to the rear display cover portion via the first ledge and the second ledge, the first ledge and the second ledge providing structural support for the bezel.

2. The portable information handing system of claim 1, wherein:
   the rear display cover portion comprises a third ledge and a fourth ledge, the third ledge and the fourth ledge being positioned between the first ledge and the second ledge.

3. The portable information handing system of claim 2, wherein:
   at least one of the third ledge and the fourth ledge include a corresponding ledge width; and,
   the corresponding ledge width is no less than a predetermined ledge width.

4. The portable information handing system of claim 3, wherein:
   the predetermined ledge width is substantially 6.25 mm.

5. The portable information handing system of claim 2, wherein:
   the third ledge and the fourth ledge define an open space, the open space having a corresponding open space width; and,
   the corresponding open space width is no greater than a predetermined open space width.

6. The portable information handing system of claim 5, wherein:
   the predetermined open space width is substantially 15.00 mm.

7. An information handling system comprising:
a base chassis, the base chassis comprising a motherboard, the motherboard comprising a processor and a bus coupled to the processor; and,
a display chassis, the display chassis comprising a rear display cover, the rear display cover comprising a rear display cover portion, a camera component and a bezel, the rear display cover portion comprising a camera component attachment portion, the camera component attachment portion comprising a first ledge and a second ledge, the camera component being positioned between the first ledge and the second ledge, the bezel being attached to the rear display cover portion via the first ledge and the second ledge, the first ledge and the second ledge providing structural support for the bezel.

8. The information handling system of claim 7, wherein:
the rear display cover portion comprises a third ledge and a fourth ledge, the third ledge and the fourth ledge being positioned between the first ledge and the second ledge.

9. The information handling system of claim 8, wherein:
at least one of the third ledge and the fourth ledge include a corresponding ledge width; and,
the corresponding ledge width is no less than a predetermined ledge width.

10. The information handling system of claim 9, wherein:
the predetermined ledge width is substantially 6.25 mm.

11. The information handling system of claim 8, wherein:
the third ledge and the fourth ledge define an open space, the open space having a corresponding open space width; and,
the corresponding open space width is no greater than a predetermined open space width.

12. The information handling system of claim 5, further comprising:
the predetermined open space width is substantially 15.00 mm.

13. A display chassis, comprising:
a rear display cover, a camera component and a bezel, the rear display cover comprising a camera component attachment portion, the camera component attachment portion comprising a first ledge and a second ledge, the camera component being positioned between the first ledge and the second ledge, the bezel being attached to the rear display cover portion via the first ledge and the second ledge, the first ledge and the second ledge providing structural support for the bezel.

14. The display chassis of claim 13, wherein:
the rear display cover portion comprises a third ledge and a fourth ledge, the third ledge and the fourth ledge being positioned between the first ledge and the second ledge.

15. The display chassis of claim 14, wherein:
at least one of the third ledge and the fourth ledge include a corresponding ledge width; and,
the corresponding ledge width is no less than a predetermined ledge width.

16. The display chassis of claim 15, wherein:
the predetermined ledge width is substantially 6.25 mm.

17. The display chassis of claim 14, wherein:
the third ledge and the fourth ledge define an open space, the open space having a corresponding open space width; and,
the corresponding open space width is no greater than a predetermined open space width.

18. The display chassis of claim 17, wherein:
the predetermined open space width is substantially 15.00 mm.

* * * * *